US 8,773,618 B2

(12) United States Patent
Seo et al.

(10) Patent No.: US 8,773,618 B2
(45) Date of Patent: Jul. 8, 2014

(54) LIGHT EMITTING UNIT AND LIQUID CRYSTAL DISPLAY APPARATUS HAVING THE SAME

(75) Inventors: Jeong-phil Seo, Suwon-si (KR); Gil-tae Hur, Suwon-si (KR); Yong-hun Kwon, Anyang-si (KR); Kye-hoon Lee, Suwon-si (KR); Young-min Lee, Bucheon-si (KR); Kun-ho Cho, Suwon-si (KR); Suk-ju Choi, Jeonju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 166 days.

(21) Appl. No.: 13/422,134

(22) Filed: Mar. 16, 2012

(65) Prior Publication Data
US 2013/0050616 A1 Feb. 28, 2013

(30) Foreign Application Priority Data
Aug. 30, 2011 (KR) .................... 10-2011-0087175

(51) Int. Cl.
*G02F 1/1335* (2006.01)
*F21V 7/04* (2006.01)

(52) U.S. Cl.
USPC .............. 349/65; 349/70; 349/71; 362/613; 362/614

(58) Field of Classification Search
USPC .................. 349/65, 70, 71; 362/613, 614
See application file for complete search history.

(56) References Cited

U.S. PATENT DOCUMENTS

| 7,771,108 | B2 * | 8/2010 | Iwasaki ................. 362/634 |
| 8,477,265 | B2 * | 7/2013 | Yoo ......................... 349/67 |
| 8,482,699 | B2 * | 7/2013 | Chang et al. ............ 349/65 |
| 2007/0241661 | A1 * | 10/2007 | Yin ....................... 313/502 |
| 2008/0105887 | A1 * | 5/2008 | Narendran et al. ....... 257/98 |
| 2010/0061078 | A1 * | 3/2010 | Kim ........................ 362/84 |

FOREIGN PATENT DOCUMENTS

| JP | 2011-124189 A | | 6/2011 |
| JP | 2011124189 A | * | 6/2011 |
| JP | 2011-165531 A | | 8/2011 |

OTHER PUBLICATIONS

Communication dated Dec. 7, 2012, issued by the European Patent Office in counterpart European Patent Application No. 12161106.5.

\* cited by examiner

*Primary Examiner* — Mike Qi
(74) *Attorney, Agent, or Firm* — Sughrue Mion, PLLC

(57) ABSTRACT

A light emitting unit and a liquid crystal display apparatus including the same are provided. The light emitting unit includes a light source unit which generates light, and a driving board which drives the light source unit. The light source unit includes a light source which generates the light, a container member which forms an opening therein and which contains the light source within the opening, and a fluorescent member mounted in the opening of the container member. The light source and the florescent member are spaced apart.

18 Claims, 10 Drawing Sheets

LIGHT EMITTING UNIT AND LIQUID CRYSTAL DISPLAY APPARATUS HAVING THE SAME

CROSS-REFERENCE TO RELATED APPLICATION

This application claims priority from Korean Patent Application No. 10-2011-0087175, filed on Aug. 30, 2011, in the Korean Intellectual Property Office, the disclosure of which is incorporated herein by reference in its entirety.

BACKGROUND

1. Field

Apparatuses consistent with exemplary embodiments relate to a light emitting unit for a liquid crystal display (LCD) apparatus and an LCD apparatus having the same.

2. Description of the Related Art

LCD apparatuses are an apparatus for implementing an image using liquid crystal (LC). The LCD apparatuses are applied to various types of display apparatuses such as a television or a computer monitor.

The LCD apparatus includes an LC panel which display light into an image and a light emitting unit which provides the light to the LC panel.

Typically, an exterior electrode fluorescent lamp (EEFL), a cold cathode fluorescent lamp (CCFL), or the like has been used as the light emitting unit. Recently, the use of a light emitting diode (LED) which can improve color reproduction without use of silver (Ag) has increased.

The light emitting unit is divided into an edge type and a direct type according to a position of a light source which emits light. The edge type light emitting unit refracts light of a light source disposed in a side with respect to an LC panel through a light guide panel (LGP) and provides the refracted light to the LC panel. The direct type light emitting unit disposes a plurality of light sources on a rear surface of an LC panel to supply light.

A fluorescent member is mostly charged in the inside of the light emitting unit in the related art. When the fluorescent member has a poor thermal property, the lifespan is reduced due to the heat dissipated from the light source. In particular, the heat dissipated from the light source is becoming an important issue in a quantum dot which receives attention as the fluorescent member in recent years.

Therefore, there is a need for a method for preventing a property of a fluorescent member being degraded due to the heat dissipated from the light source.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiment provide a light emitting unit capable of preventing a property of a fluorescent member vulnerable to heat being degraded and a liquid crystal display (LCD) apparatus including the same.

According to an aspect of an exemplary embodiment, there is provided a light emitting unit for an LCD apparatus. The light emitting unit may include: a light source unit which generates light; and a driving board which drives the light source unit. The light source unit may include a light source which generates the light; a container member which forms an opening therein and which contains the light source within the opening; and a fluorescent member mounted in the opening of the container member. The light source and the florescent member may be spaced apart.

The container member may include a florescent member mount unit in which the fluorescent member is mounted.

The fluorescent member mount unit may include a first mount groove located at a first side of the opening and a second mount groove located at a second side of the opening which is opposite to the first side of the opening, and in which a first edge of the fluorescent member is fitted and mounted in the first mount groove and a second edge of the fluorescent member is fitted and mounted in the second mount groove.

The fluorescent member mount unit may be adhered to opposing edges of the fluorescent member by an adhesive.

A plurality of light source units may be included and the plurality of light source units may be spaced apart from each other.

A number of fluorescent members may be less than a number of light sources. One or more of the fluorescent members may be mounted in two or more fluorescent member mount units.

A single fluorescent member may be included and the single fluorescent member may be mounted in a plurality of fluorescent member mount units.

The fluorescent member may include a fluorescent material consisting of a quantum dot.

The quantum dot may be sealed with glass to block oxygen.

The quantum dot may be sealed with a barrier film to block oxygen.

According to an aspect of another exemplary embodiment, there is provided an LCD apparatus including any one of the light emitting units for an LCD apparatus.

The LCD apparatus may include the light emitting unit; and an LC panel which displays light generated from the light emitting unit into a color image. The LCD apparatus may be an edge type display such that light emitting unit may be disposed at a side of the LC panel.

The LCD apparatus may include the light emitting unit; and an LC panel which displays light generated from the light emitting unit into a color image. The LCD apparatus may be a direct type display such that light emitting unit may be disposed at a rear surface of the LC panel.

According to the exemplary embodiments, since the fluorescent member is integrally mounted in a container member to be spaced apart from a light emitting diode (LED) chip which is a heat source, property degradation of the fluorescent member due to heat can be prevented with a simple structure so that performance of the fluorescent member can be improved and maintained for long period of time.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
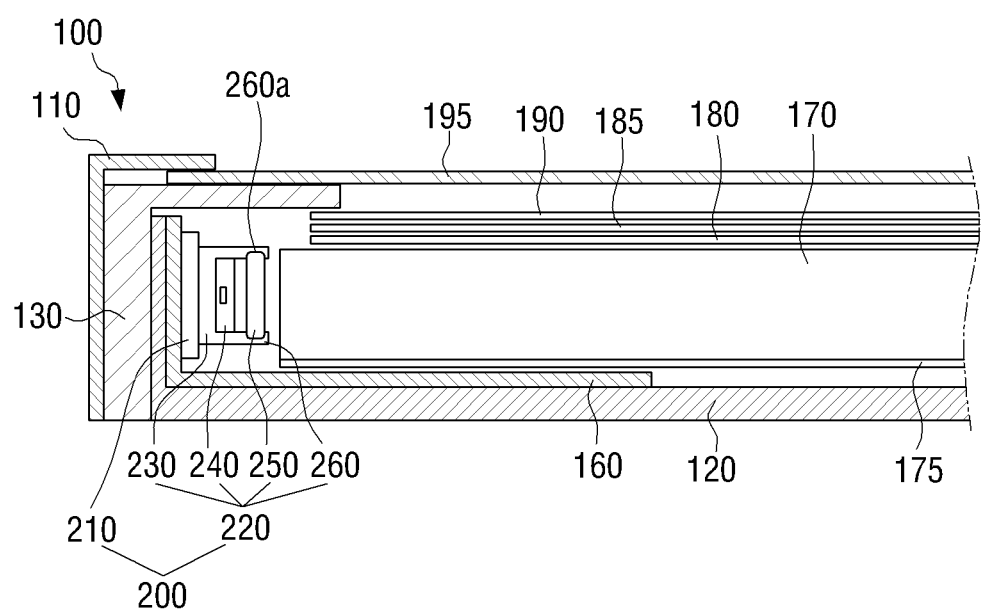
FIG. 1 is a schematic cross-sectional view illustrating an example of an edge type panel assembly according to an exemplary embodiment.

Hereinafter, exemplary embodiments will be described in greater detail with reference to the accompanying drawings.

In the following description, same reference numerals are used for the same elements, even when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2A:
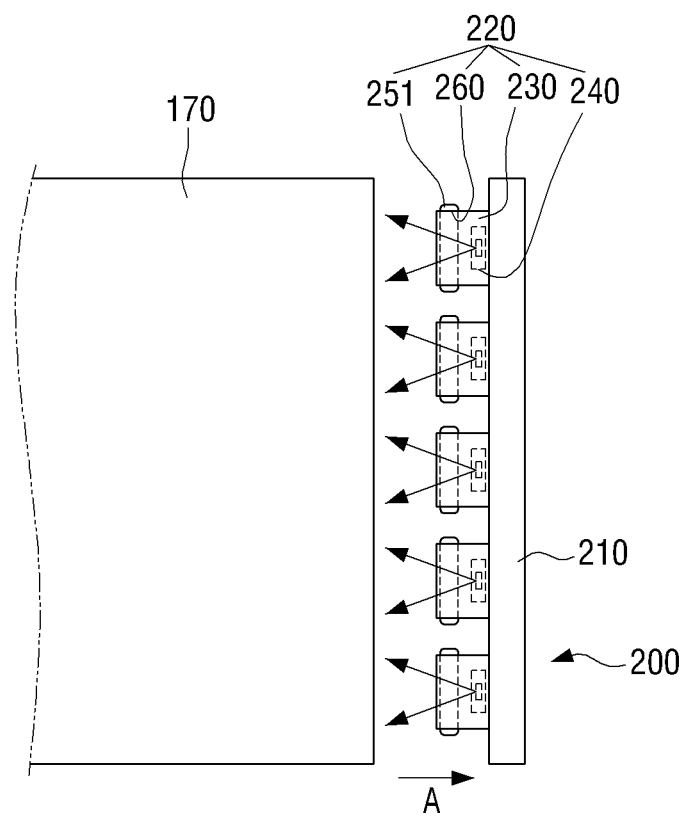
FIG. 2A is a schematic cross-sectional view illustrating a light emitting unit included in the edge type panel assembly of FIG. 1 according to a first exemplary embodiment.
Figure 2B:
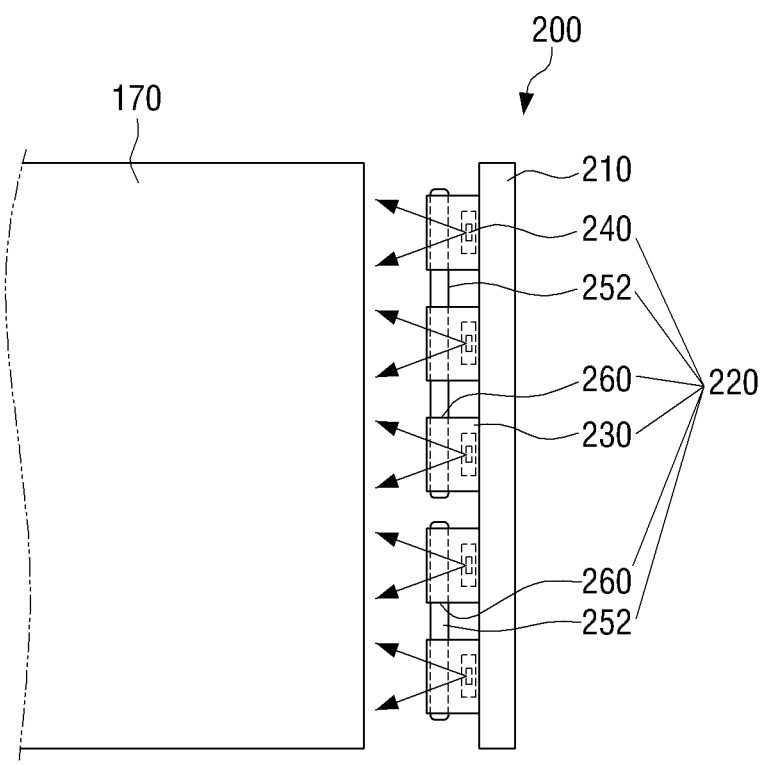
FIG. 2B is a schematic cross-sectional view illustrating a light emitting unit included in the edge type panel assembly of FIG. 1 according to a second exemplary embodiment.
Figure 2C:
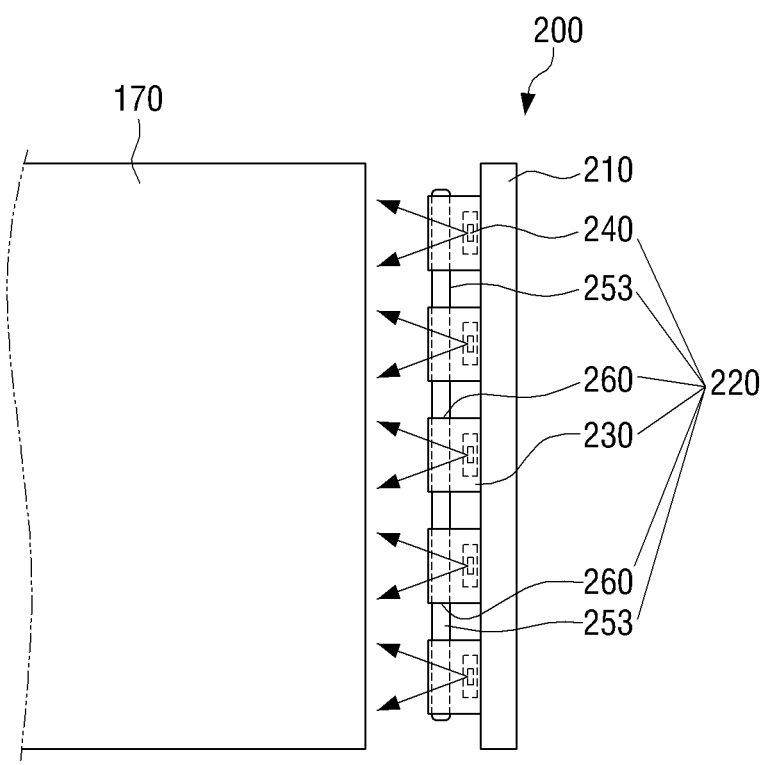
FIG. 2C is a schematic cross-sectional view illustrating a light emitting unit included in the edge type panel assembly of FIG. 1 according to a third exemplary embodiment.

FIGS. 1 to 2C illustrate light emitting units in various sides according to first to third exemplary embodiments.

First, an edge type panel assembly according to an exemplary embodiment will be reviewed below.

Referring to FIG. 1, the edge type panel assembly 100 includes a top chassis 110 configured at the outermost lateral side and front position, a bottom chassis 120 configured at the outermost rear position and which contains various types of components of the edge type panel assembly 100, an intermediate mold unit 130 equipped between the top chassis 110 and the bottom chassis 120, and a light emitting unit 200 including a driving board 210 and a light source unit 220. Each of the top chassis 110, the bottom chassis 120 and the intermediate mold unit 130 are L-shaped such that the lateral sides thereof are disposed adjacently to one another.

A heat sink 160 is L-shaped and is mounted on the bottom chassis 120. A lateral side of the heat sink 160 is disposed adjacent to the lateral side of the bottom chassis 120. Furthermore, the light emitting unit 200 is equipped on the lateral side the heat sink 160 opposite to the lateral side of the bottom chassis 120. The heat sink 160 includes a metal material (for example, aluminum (Al) or the like) having high thermal conductivity.

A light guide panel 170 which converts a line light source emitted from the light emitting unit 200 into a surface light source is equipped on the inside of the bottom chassis 120 and a reflection sheet 175 which prevents light loss of a rear part of the edge type panel assembly 100 is disposed below the light guide panel 170.

The intermediate mold unit 130 supports parts of components of the edge type panel assembly 100 together with the top chassis 110 and the bottom chassis 120. For this, the intermediate mold unit 130 is disposed at an edge of the inside of the edge type panel assembly 100 between the top chassis 110 and the bottom chassis 120.

A diffusion sheet 180 which diffuses scattered light emitted from the light guide panel 170 is disposed over the light guide panel 170. A prism sheet 185 which increases brightness of the light and a dual brightness enhancement film (DBEF) sheet 190 are sequentially disposed over the diffusion sheet 180.

An LC panel 195 is mounted on the bottom chassis 120 to face a rear surface of the DBEF sheet 190. The LC panel 195 displays the light generated from the light emitting unit 200 into a color image. For this, the LC panel 195 includes a color filter substrate (not shown), which includes a color filter layer, a thin film transistor (TFT) substrate (not shown), which includes TFTs, and a LC (not shown) which is interposed between the color filter substrate and the TFT substrate. Since the LC panel 195 has been well-known, detailed description thereof will be omitted.

Hereinafter, the light emitting units according to the first to third exemplary embodiments will be reviewed with reference to FIGS. 2A to 2C.

The light emitting unit 200 according to the first exemplary embodiment includes a driving board 210 and a light source unit 220.

The driving board 210 drives the light source unit 220, which includes a container member 230, a light source 240, a fluorescent member 250 and a fluorescent member mount unit 260, as shown in FIG. 1. The fluorescent member 250 may be provided in different variations (e.g., fluorescent members 251, 252 and 253), which will be described in conjunction with FIGS. 2A-2C. The driving board 210 is mounted on the heat sink 160 and the light source unit 220 is mounted on the driving board 210 to generate light.

The light source unit 220 includes a container member 230 of which one side is mounted on the lateral side of the driving board 210, a light source 240 mounted inside the container member 230 (e.g., inside an opening or cavity of the container member), and a fluorescent member 251 mounted in the container member 230 (e.g., inside an opening or cavity of the container member) and spaced apart from the light source 240 at a preset distance.

A plurality of the light source unit 220 in which the fluorescent member 251 is mounted are mounted to be spaced apart from each other.

The light source 240 generates the light and radiates the light toward the light guide panel 170. In the exemplary embodiment, the light source may include a LED chip which includes an LED. In alternative exemplary embodiments, various types of light sources may be applied.

As the fluorescent member 251, known various type of fluorescent members may be applied. In the exemplary embodiment, the fluorescent member may include a quantum dot which has emerged in recent years as a fluorescent material. In particular, the fluorescent member 251 receives the light emitted from the light source 240, is excited by the light, and generates a second light that is emitted toward the light guide panel 170.

The quantum dot is a nano material having a size of 10 to 15 nm, which generates light having a short wavelength when particles of the quantum dot are small and which generates light having a long wavelength when the particles of the quantum dot are large. The quantum dot generates all visible spectrums of light by controlling a particle size thereof. The quantum dot can implement full-color by a material itself and control a wavelength of the light easily so that the quantum dot has good color reproduction and brightness.

However, since the quantum dot has a property vulnerable to heat and oxygen, when the fluorescent member 251 includes a quantum dot as a fluorescent material, the fluorescent member 251 may use a material (glass or barrier film) to block oxygen. For example, when the fluorescent member 251 uses a glass tube, both sides of the glass tube are sealed to block oxygen.

The fluorescent member mount unit 260 in which the florescent member 251 is mounted is integrally formed in the other side of the container member 230.

The fluorescent member mount unit 260 is formed at a position in which the fluorescent member 251 is separated from the light source 240 when the fluorescent member 251 is mounted.

Here, a mount groove 260a corresponding to shapes of both end portions of the fluorescent member 251 is formed in the fluorescent member mount unit 260. The fluorescent member 251 is inserted into the fluorescent member mount unit 260 in an A direction shown in FIG. 2A so that the both end portions of the fluorescent member 251 are fitted and mounted in the mount grooves 260a. Thus, the fluorescent member mount unit 260, that is, the container member 230 may be made of an elastically deformable material so that the fluorescent member 251 can be inserted. In an alternative embodiment, the fluorescent member 251 is adhered and mounted through an adhesive in place of being fit and mounted into the mount grooves 260a.

Since the light source 240 and the fluorescent member 251 are spaced apart from each other, a space between the light source 240 and the fluorescent member 251 is formed in the container member 230 as shown in FIG. 1.

When the light is radiated from the light source 240, there is a case in which some of the light is reflected within the container member 230. In this case, the light is recycled through upper and lower inside surfaces of the container member 230 in the space between the light source 240 and the fluorescent member 251 as shown in FIG. 1, and penetrates through the fluorescent member 251, and radiates towards a light guide plate 170 side.

Since the fluorescent member 251 is disposed to be separated from the light source 240 without being in direct contact with the light source 240 in the exemplary embodiment, the fluorescent member 251 is not in direct contact with the light source 240 as a heat source. Thus, the light emitting unit 200 in the exemplary embodiment can prevent a property of the fluorescent material 251 from being degraded due to heat and consistently maintain its performance.

In addition, the fluorescent member 251 in the exemplary embodiment is integrally mounted in the container member 230 in which the light source 240 is mounted so that an additional fixing structure other than the container member 230 for fixing the fluorescent member 251 is not necessary.

Subsequently, the light emitting unit included in the edge type panel assembly according to another exemplary embodiment will be described. Among components illustrated in each exemplary embodiment, components having the same structure as in the above-described exemplary embodiment are denoted by the same reference numerals and redundancy description will be omitted or simplified. The light emitting unit according to each exemplary embodiment will be described below focusing on the differences with the above-described exemplary embodiments.

The light emitting unit according to the second embodiment will be described below.

Referring to FIG. 2B, the light emitting unit 200 according to the second exemplary embodiment includes fluorescent members 252. The number of the fluorescent member 252 is at least one less than the number of the light sources 240. In the exemplary embodiment, five light sources 240 and two fluorescent members 252 are provided. The number of the light source 240 and the number of the fluorescent members 252 are only illustrative, as long as the number of the fluorescent members 252 is less than the number of the light sources 240.

From FIG. 2B, a fluorescent member 252 disposed in an upper side is mounted in three fluorescent member mount units 260 and a fluorescent member disposed in a lower side is mounted in two fluorescent member mount units 260. Thus, the one fluorescent member 252 spans across three light source units 220, and the other fluorescent member 252 spans across two light source units 220.

In the light emitting unit 200 of the second exemplary embodiment, since the number of the fluorescent members 252 is less than the number of the container members 230 in which the light sources 240 are mounted, the number of the fluorescent members fabricated is reduced and thus a fabrication cost of the fluorescent members can be reduced.

The light emitting unit according to the third exemplary embodiment will be reviewed below.

Referring to FIG. 2C, in the light emitting unit 200 according to the third exemplary embodiment, one fluorescent member 253 is mounted in fluorescent member mount units 260 each of which is included in each of the plurality of the container member 230, along a length direction of the driving board 210. Thus, the fluorescent member 253 spans across all the light source units 220 aligned in the length direction.

In the light emitting unit 200 of the third exemplary embodiment, only one fluorescent member 253 is mounted and thus fabrication and mounting of the fluorescent member 253 is facilitated.

Figure 3:
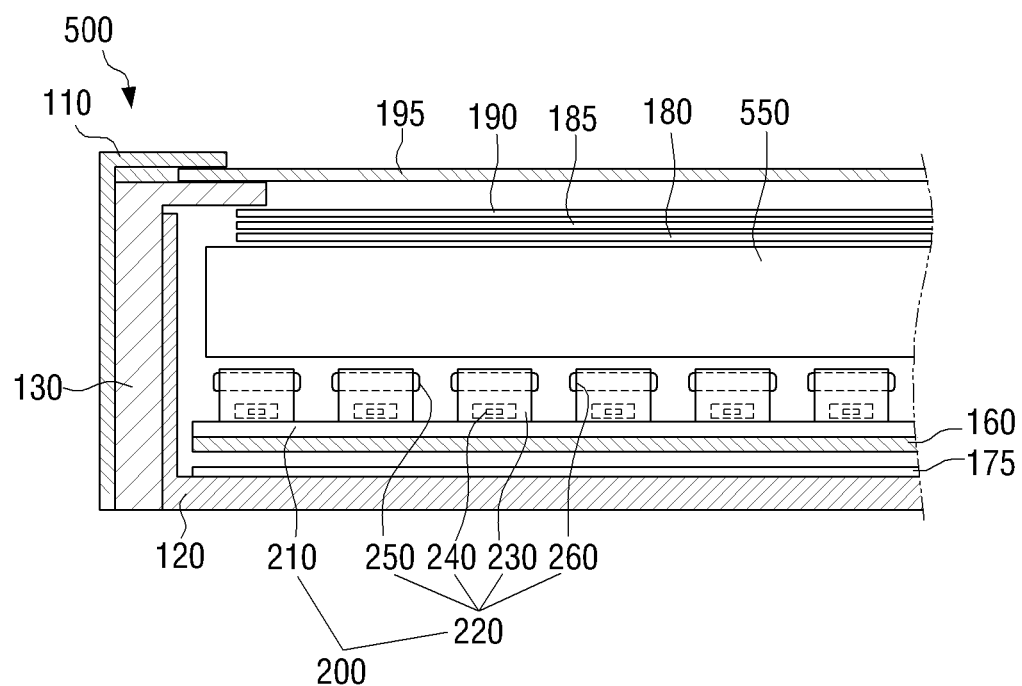
FIG. 3 is a schematic cross-sectional view illustrating an example of a direct type panel assembly according to an exemplary embodiment.
Figure 4A:
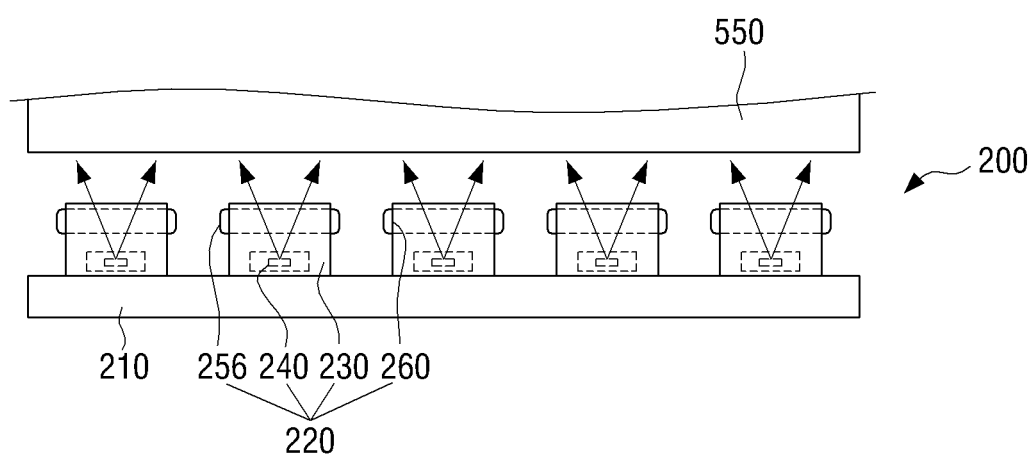
FIG. 4A is a schematic cross-sectional view illustrating a light emitting unit included in the direct type panel assembly of FIG. 3 according to a fourth exemplary embodiment.
Figure 4B:
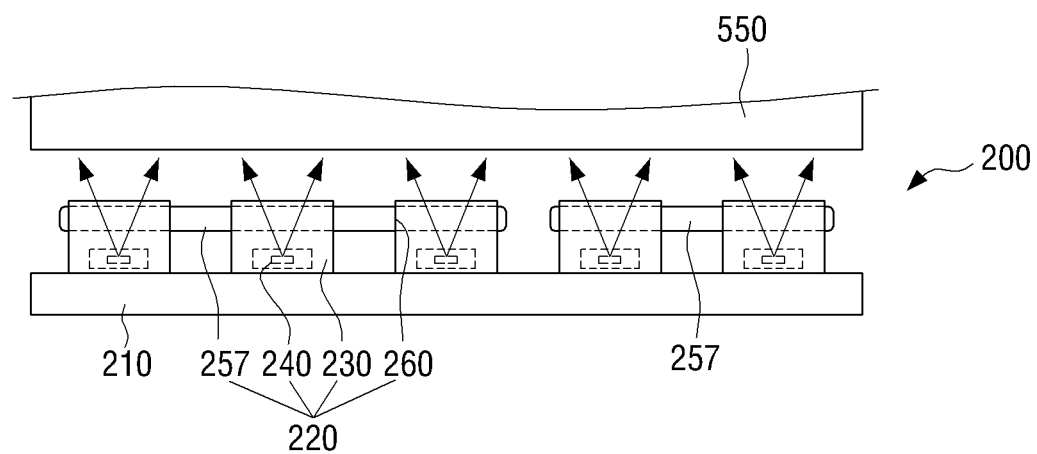
FIG. 4B is a schematic cross-sectional view illustrating a light emitting unit included in the direct type panel assembly of FIG. 3 according to a fifth exemplary embodiment.
Figure 4C:
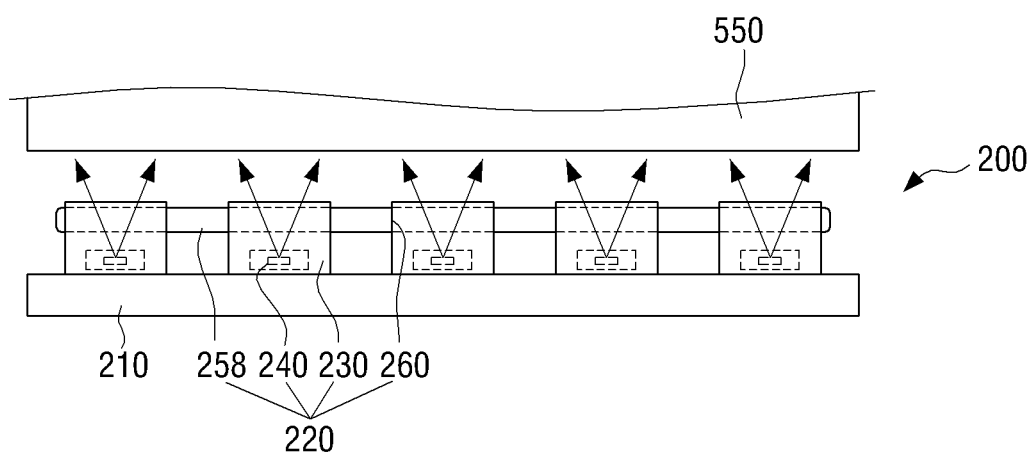
FIG. 4C is a schematic cross-sectional view illustrating a light emitting unit included in the direct type panel assembly of FIG. 3 according to a sixth exemplary embodiment.

FIGS. 3 to 4C illustrate light emitting unit included in a direct type panel assembly according to fourth to sixth exemplary embodiments in various sides.

The direct type panel assembly according to an exemplary embodiment will be reviewed below.

Referring to FIG. 3, the direct type panel assembly 500 includes a light emitting unit 200 disposed in a lower side of the inside of a bottom chassis 120 differently from the edge type panel assembly.

A heat sink 160 is mounted below a driving board 210 of the light emitting unit 200 and a reflection sheet 175 is disposed below the heat sink 160.

In the direct type panel assembly 500, since the light emitting unit 200 is disposed on a lower side of the direct type panel assembly 500 to directly radiate light upwardly, the light guide panel which is included in the edge type panel assembly is not required. In place of the light guide panel, a diffusion plate 550 is provided which uniformly diffuses irregular light radiated from the light emitting unit 200 and supports the sheets thereon.

Hereinafter, the light emitting units according to the fourth to sixth exemplary embodiment will be reviewed with reference to FIGS. 4A to 4C below.

The light emitting unit 200 according to the fourth exemplary embodiment includes a plurality of fluorescent members 256, a number of which corresponds to the number of the light sources 240. Each one of the fluorescent members 256 is mounted in a respective one of the fluorescent member mount units 260 which are included in the container members 230.

Thus, like the fluorescent member of the first exemplary embodiment, since the fluorescent member 256 of the exemplary embodiment is not in direct contact with the light source 240, the fluorescent member 256 is not in direct heat contact with the light source 240 which is a heat source, thereby preventing a thermal property of the fluorescent member 256 being degraded. In addition, since the fluorescent member 256 is integrally mounted in the container member 230 in which the light source 240 is mounted, an additional fixing structure is not required other than the container member 230 for fixing the fluorescent member 256.

The light emitting unit according to the fifth embodiment will be reviewed below.

Referring to FIG. 4B, like the light emitting unit 200 of the second embodiment, the light emitting unit 200 includes fluorescent members 257. The number of the fluorescent members 257 is at least one less than the number of the light sources 240. In the exemplary embodiment, five light sources 240 and two fluorescent members 257 are provided. The number of the light sources 240 and the number of the fluorescent material members 257 are only illustrative, as long as the number of the fluorescent members 257 is less than the number of the light sources 240.

From FIG. 4B, a fluorescent member 257 disposed at a left side is mounted a three fluorescent member mount units 260 and a fluorescent member 257 disposed at a right side is mounted in two fluorescent member mount units 260. Thus, the one fluorescent member 257 spans across three light source units 220, and the other fluorescent member 257 spans across two light source units 220.

In the light emitting unit 200 of the fifth exemplary embodiment, like the second embodiment, since the number of the fluorescent members 257 is less than the number of the container members 230 in which the light sources 240 are mounted, the number of the fluorescent members fabricated is reduced and thus a fabrication cost of the fluorescent member can be reduced.

The light emitting unit according to the sixth exemplary embodiment will be reviewed below.

Referring to FIG. 4C, in the light emitting unit 200 according to the sixth exemplary embodiment, like the third embodiment, one fluorescent member 258 is mounted in fluorescent member mount units 260 each of which is included in each of the plurality of the container member 230, along a length direction of the driving board 210. Thus, the fluorescent member 258 spans across all the light source units 220 aligned in the length direction.

In the light emitting unit 200 of the sixth exemplary embodiment, only one fluorescent member 258 is mounted like the third exemplary embodiment and thus fabrication and mounting of the fluorescent member 258 is facilitated.

Figure 5:
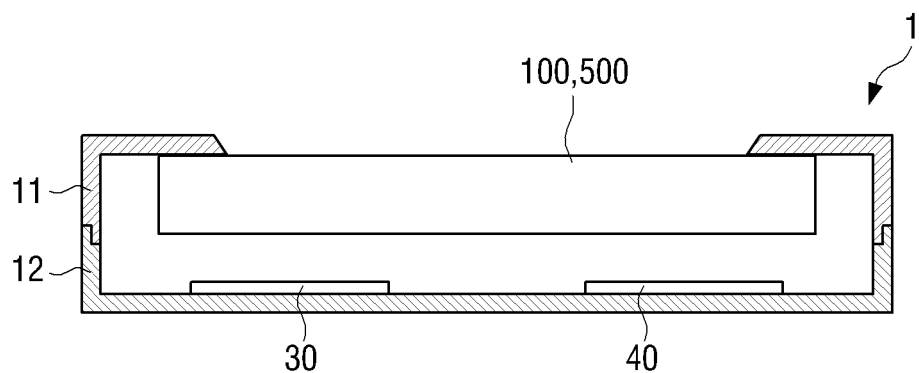
FIG. 5 is a schematic cross-sectional view illustrating an LCD apparatus according to an exemplary embodiment.

FIG. 5 is a schematic cross-sectional view illustrating an LCD apparatus according to an exemplary embodiment.

The LCD apparatus 1 of FIG. 5 illustrates an LCD television (TV). However, it should be understood by those skilled in the art that the LCD apparatus according to an exemplary embodiment may be applied to different types of display apparatuses such a computer monitor.

Referring to FIG. 5, the LCD apparatus 1 includes an upper housing 11 and a lower housing 12. The housings 11 and 12 contain any one of the edge type panel assembly 100 and the direct type panel assembly 500 according to the above-described embodiments. A power board 30 which supplies a voltage to the LCD apparatus 1 and a control board 40 are disposed in the rear of any one of the edge type panel assembly 100 and the direct type panel assembly 500. Although the power board 30 and the control board 40 are illustrated in FIG. 5, other circuit boards may be additionally included inside of the LCD apparatus 1.

Figure 6:
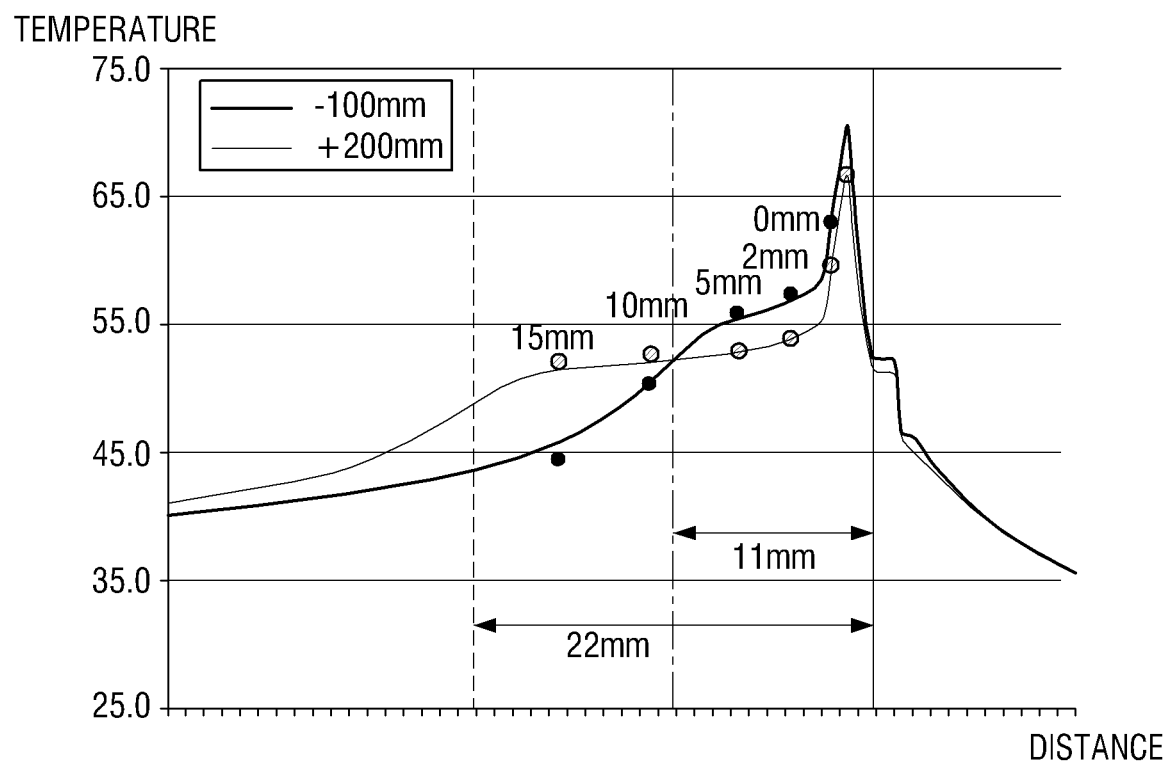
FIG. 6 is a graph illustrating a temperature distribution on a line passing through a light emitting unit and a light guide panel according to an exemplary embodiment.

FIG. 6 is a graph illustrating a temperature distribution on a line penetrating the light emitting unit and a light guide panel according to an exemplary embodiment.

The temperature distribution will be described with reference to the graph of FIG. 6.

First, the meanings of '−100 mm' indicated by a bold line and '+200 nm' indicated a fine line will be described below.

The "+/−" values denotes an upper part above a horizontal line and a lower part below the horizontal line, respectively on the base of the horizontal line when the line penetrates the inside of the screen along horizontal line under the assumption that a screen of the LCD apparatus is a rectangular shape and the horizontal line is a line dividing the screen into two equal parts.

That is, '−100 nm' denotes the temperature distribution on the line penetrating the light emitting unit and the light guide panel at a point of 100 nm below the horizontal line and '+200 nm' denotes the temperature distribution on the line penetrating the light emitting unit and the light guide panel at a point of 200 nm above the horizontal line.

The two points '−100 nm' and '+200 nm' are designated to obtain an accuracy of the experiment and may be slightly changed.

'11 mm' and '22 mm' indicated in a longitudinal axis (distance axis) denote a width of the driving boards at the points of '−100' nm and '+200 nm', respectively.

A plurality of dots indicated in the graph denote a distance spaced between the light source and the fluorescent member.

A solid dot denotes a distance between the light source and the fluorescent member at the point of '+200 mm' and a hatched dot denotes a distance between the light source and the fluorescent member at the point of '−100 nm'.

It can be seen from the graph that as the spaced distance is increased, the temperature is decreased. Thus, although it is desirable to increase the spaced distance, there are many limitations to increase the distance due to a limitation factor such as design. Thus, there are substantially many limitations to increase the distance to 5 mm or more.

It can be seen from the graph that a temperature difference is not as large at the distance of 2 nm compared to the distance of 5 mm.

Therefore, the distance between the light source and the fluorescent member may be provided at around 2 mm to make the design easy and prevent degradation of a property in the fluorescent member.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A light emitting unit for a liquid crystal display (LCD) apparatus, the light emitting unit comprising:
    a light source unit configured to generate light; and
    a driving board configured to drive the light source unit,
    wherein the light source unit comprises:
        a light source configured to generate the light;
        a container member mounted on the driving board and comprising an opening therein and configured to contain the light source within the opening; and
        a fluorescent member mounted in the opening of the container member,
        wherein the light source and the florescent member are spaced apart.

2. The light emitting unit as claimed in claim 1, wherein the container member comprises a florescent member mount unit in which the fluorescent member is mounted.

3. The light emitting unit as claimed in claim 2, wherein the fluorescent member mount unit comprises a first mount groove located at a first side of the opening and a second mount groove located at a second side of the opening which is opposite to the first side of the opening, and in which a first edge of the fluorescent member is fitted and mounted in the first mount groove and a second edge of the fluorescent member is fitted and mounted in the second mount groove.

4. The light emitting unit as claimed in claim 2, wherein the fluorescent member mount unit is adhered to opposing edges of the fluorescent member by an adhesive.

5. The light emitting unit as claimed in claim 2, further comprising a plurality of light source units, wherein the plurality of light source units are spaced apart from each other.

6. The light emitting unit as claimed in claim 5, wherein a single fluorescent member is provided which is mounted to each of the plurality of florescent member mount units.

7. The light emitting unit as claimed in claim 1, wherein the fluorescent member comprises a fluorescent material consisting of a quantum dot.

8. The light emitting unit as claimed in claim 7, wherein the quantum dot is sealed with glass which blocks oxygen.

9. The light emitting unit as claimed in claim 7, wherein the quantum dot is sealed with a barrier film configured to block oxygen.

10. A liquid crystal display (LCD) apparatus comprising the light emitting unit according to claim 1.

11. The LCD apparatus as claimed as claim 10, further comprising a liquid crystal (LC) panel configured to display light generated from the light emitting unit into a color image, wherein the LCD apparatus is an edge type display such that the light emitting unit is disposed at a side of the LC panel.

12. The LCD apparatus as claimed in claim 10, further comprising an LC panel configured to display light generated from the light emitting unit into a color image, wherein the LCD apparatus is a direct type display such that the light emitting unit is disposed at a rear surface of the LC panel.

13. The light emitting unit as claimed in claim 1, wherein the fluorescent member is configured to receive the light generated by the light source, configured to generate an excitation light, and configured to emit the excitation light.

14. The light emitting unit as claimed in claim 1, wherein the container member comprises a base portion, a first wall portion which extends from the base portion and a second wall portion which extends from the base portion such that the opening is formed between the first wall portion and the second wall portion, and
the fluorescent member is coupled to the first wall portion and the second wall portion.

15. The light emitting unit as claimed in claim 1, wherein the florescent member mount unit comprises a base portion, a first wall portion which extends from the base portion and a second wall portion which extends from the base portion such that the opening is formed between the first and second wall portions, and
wherein the first and second wall portions are configured to be elastically deformed away from each other in response to the florescent member being inserted into the florescent member mount unit.

16. A light emitting unit for a liquid crystal display (LCD) apparatus, the light emitting unit comprising:
a light source unit configured to generate light; and
a driving board configured to drive the light source unit,
wherein the light source unit comprises:
a light source which generates the light;
a container member comprising an opening therein and configured to contain the light source within the opening; and
a fluorescent member mounted in the opening of the container member,
wherein the light source and the florescent member are spaced apart,
wherein the container member comprises a florescent member mount unit in which the fluorescent member is mounted,
wherein a number of fluorescent members is less than a number of light sources, and
wherein one or more of the fluorescent members are mounted in two or more fluorescent member mount units of a plurality florescent member mount units.

17. A light emitting unit for a liquid crystal display (LCD) apparatus, the light emitting unit comprising:
a plurality of light source units configured to generate light;
a driving board configured to drive the plurality of light source units,
a plurality of container members, each of the plurality of container members comprising an opening therein, and wherein one light source of the plurality of light source units is disposed within the opening of a respective one of the plurality of container members such that a number of the plurality of light source units is equal to a number of the plurality of container members; and
a fluorescent member mounted in the openings of at least two container members of the plurality of container members,
wherein the light sources of the plurality of light source units that are disposed within the at least two container members are spaced apart from the florescent member,
wherein each container member of the plurality of container members is spaced apart from another container member of the plurality of container members by a distance, and the fluorescent member spans the distance between the at least two container members.

18. A light emitting unit for a liquid crystal display (LCD) apparatus, the light emitting unit comprising:
a plurality of light source units configured to generate light;
a driving board configured to drive the plurality of light source units,
a plurality of container members, each of the plurality of container members comprising an opening therein, and wherein one light source of the plurality of light source units is disposed within the opening of a respective one of the plurality of container members such that a number of the plurality of light source units is equal to a number of the plurality of container members; and
a fluorescent member mounted in the openings of at least two container members of the plurality of container members;
wherein the light sources of the plurality of light sources that are disposed within the at least two container members are spaced apart from the florescent member.

* * * * *